(12) United States Patent
Friedrich

(10) Patent No.: US 6,920,900 B2
(45) Date of Patent: Jul. 26, 2005

(54) SEWER PIPE SECTION

(75) Inventor: Ralph S. Friedrich, Hermosa Beach, CA (US)

(73) Assignee: Ameron International Corporation, Pasadena, CA (US)

( * ) Notice: Subject to any disclaimer, the term of this patent is extended or adjusted under 35 U.S.C. 154(b) by 0 days.

(21) Appl. No.: 10/394,830

(22) Filed: Mar. 21, 2003

(65) Prior Publication Data

US 2003/0178079 A1 Sep. 25, 2003

Related U.S. Application Data

(60) Provisional application No. 60/366,669, filed on Mar. 22, 2002.

(51) Int. Cl.[7] ............................................. F16L 55/16
(52) U.S. Cl. ..................... 138/98; 138/109; 138/141; 138/155
(58) Field of Search ................... 138/98, 153, 172, 138/173, 109, 96 R

(56) References Cited

U.S. PATENT DOCUMENTS

| | | | | |
|---|---|---|---|---|
| 3,720,428 A | * | 3/1973 | Zastawny | 285/368 |
| 3,925,132 A | * | 12/1975 | Bartlow et al. | 156/161 |
| 4,134,431 A | * | 1/1979 | Davidson et al. | 138/109 |
| 4,205,707 A | * | 6/1980 | Lundgren | 138/89 |
| 4,268,047 A | * | 5/1981 | Tashlick | 277/627 |
| 4,330,811 A | * | 5/1982 | Bordner | 361/212 |
| 4,647,080 A | * | 3/1987 | Sandt et al. | 285/296.1 |
| 4,796,669 A | * | 1/1989 | St. Onge | 138/97 |
| 5,148,835 A | * | 9/1992 | Clark | 138/96 T |
| 5,167,258 A | | 12/1992 | Rice | |
| 5,316,352 A | | 5/1994 | Smith | |
| 5,458,155 A | * | 10/1995 | Stephens | 138/98 |
| 5,499,660 A | * | 3/1996 | StorgArd | 138/98 |
| 5,662,360 A | | 9/1997 | Guzowski | |
| 5,785,092 A | * | 7/1998 | Friedrich et al. | 138/133 |
| 5,799,705 A | * | 9/1998 | Friedrich et al. | 138/144 |
| 6,176,523 B1 | * | 1/2001 | Winslett | 285/24 |
| 6,179,945 B1 | * | 1/2001 | Greenwood et al. | 156/171 |

* cited by examiner

*Primary Examiner*—James Hook
(74) *Attorney, Agent, or Firm*—Christie, Parker & Hale, LLP

(57) ABSTRACT

A pipe section for lining sewer pipelines along with a system of such pipe sections and method of lining a sewer pipeline are provided. The pipe section has a first end portion having a spigot. A protective ring is mounted around the spigot for transferring a load to the pipe section for axially moving the pipe section within a sewer pipeline. A second end portion of the pipe section is designed for surrounding the spigot of an adjacent pipe. A seal is formed is formed around the spigot for sealing with the second end portion of the adjacent pipe section.

48 Claims, 4 Drawing Sheets

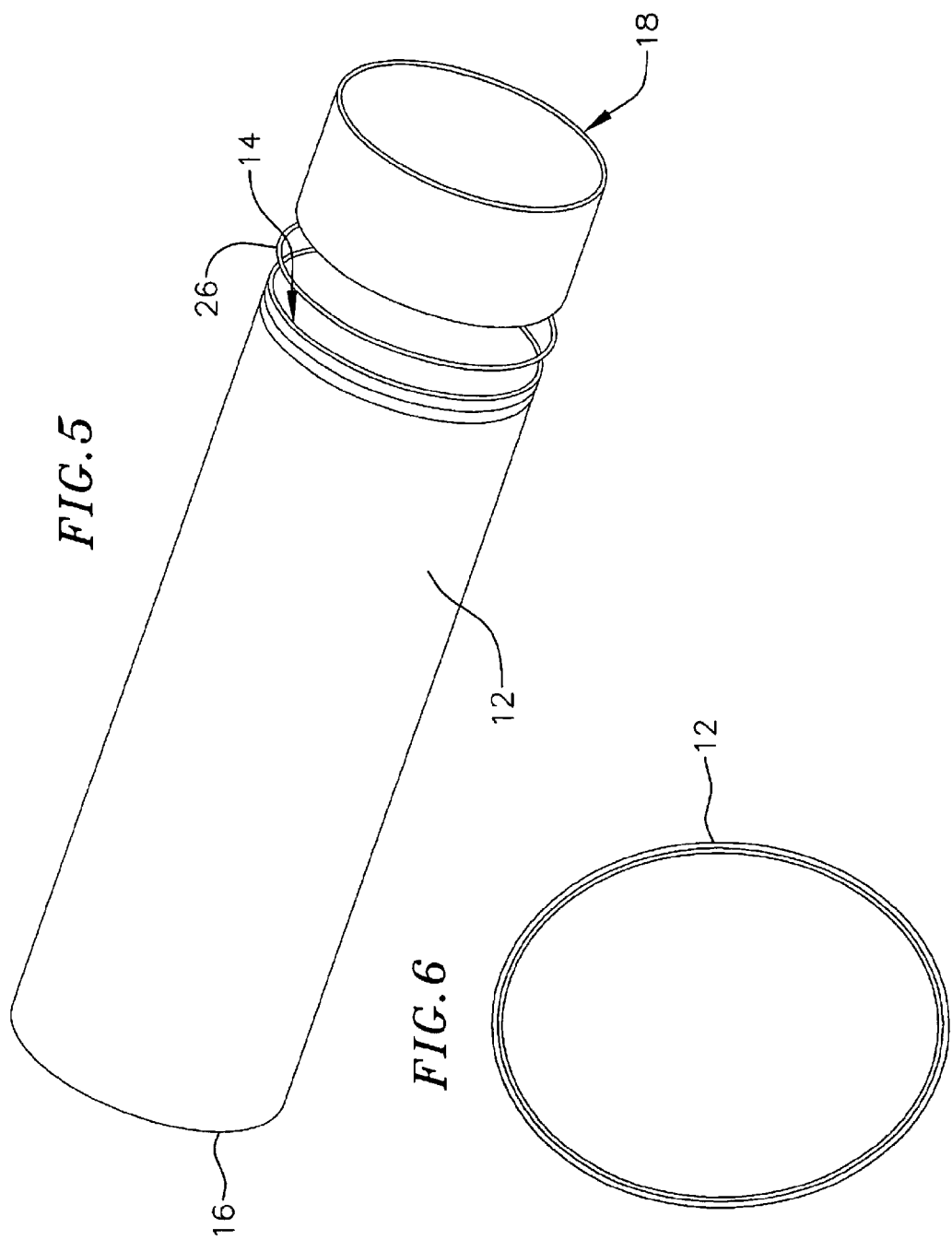

SEWER PIPE SECTION

CROSS REFERENCE TO RELATED APPLICATION

This application is based upon and claims priority on U.S. Provisional Application No. 60/366,669 filed on Mar. 22, 2002.

FIELD OF THE INVENTION

This invention relates to sewer pipes and, more particularly, to a composite slip pipe section that is specially configured for placement with an existing sewer pipe.

BACKGROUND OF THE INVENTION

The oldest sewers across the nation are often non-circular as for example, elliptical, horse shoe or parabolic, in cross-sectional shape. Such sewer lines are in need of repair and/or rehabilitation, but normally cannot be taken out of service during the rehabilitation effort because they are both large in diameter, and critical to the overall capacity of the city's sewer system. One approach to repairing these sewer lines would be by using by-pass lines. However, such by-pass lines would be large, affect traffic at street level and thus be impractical for these larger diameter sewers.

An alternative approach to repairing such large non-circular sewer pipelines is by relining them in a "live" condition by jacking relining pipe sections into the sewer pipeline. This process is known as slip lining. This is accomplished by cutting a top portion of a pipe in the sewer pipeline inserting in a relining pipe section and pushing (i.e., jacking) the relining pipe section forward in the sewer pipeline. The lining pipe is pushed further forward as a new lining pipe section is inserted and pushed forward in the sewer pipeline section. However, the approach of slip lining is not without its problems, as the jacking loads that are used for installing the new lining pipe section into position can be very high, and can result in damage to the ends of the lining pipe section.

Conventional pipe sections used for slip lining sewer pipes in this manner are not configured having a non-circular cross-section, but rather are configured having a circular cross-section. An example of such slip lining pipe is one available from HOBAS Engineering AG, Houston, Tex. The use of such conventional slip lining pipe (having a circular cross-section) to repair an elliptical sewer pipe, for example, results in a reduced effective fluid transport passage, thereby providing a significant reduction or loss of fluid transport capacity. This loss of capacity is often too high relative to the city's needs. For example, the use of such conventional slip lining pipe to repair a typical 73 inch×60 inch elliptical sewer pipe reduces the sewer pipe capacity from approximately 90 cfs to 50 cfs, i.e., producing a 44 percent reduction of capacity.

Moreover, conventional slip pipe sections, such as the HOBAS pipes are manufactured using a spinning process. As such these pipes have a resin rich inner surface for providing necessary corrosion protection on the inside of the pipe. However, the ends of the HOBAS pipes are saw cut and expose sand filler and chopped fiber that make up the pipes' structural walls. These cut ends are exposed to the sewer gases that can cause rapid deterioration of the pipe ends forming the pipeline.

Other lining pipe sections currently used such as the Spiro Lite pipe made by Chevron have external circumferential ribs for stiffening the lining pipe. These ribs are rounded in cross-section and tend to mechanically lock on the imperfections inside the host sewer pipeline preventing the insertion of the lining pipe in the sewer pipeline.

It is, therefore, desired that a pipe section be constructed for elliptical sewer pipelines by slip lining in a manner that does not produce a large reduction of fluid transport capacity. It is also desired that the pipe section comprise joints at the ends that are self sealing, capable of withstanding the jacking loads, and that are corrosion resistant to the sulfuric acid attack typically found inside a sewer line (pH=1). Moreover a lining pipe is desired that does not mechanically lock with the imperfections inside the sewer pipeline as it is being inserted in the sewer pipeline.

SUMMARY OF THE INVENTION

A pipe section for lining sewer pipelines along with a system of such pipe sections and method of lining a sewer pipeline are provided. In one exemplary embodiment, a pipe section is provided having a pipe section wall having an outer surface having a non-circular cross-section. A spigot is formed at a first end portion of the wall defining a shoulder on the wall. A protective ring surrounds the spigot for receiving a load from an external source for pushing the shoulder and thus, the pipe section along the sewer pipeline. The protective ring in the exemplary embodiment has a compression strength lower than that of the wall. Moreover, in the exemplary embodiment, the protective ring is made from a thermoplastic material or a hard rubber.

In an exemplary embodiment the seal is formed by fitting a seal in an annular groove formed on the spigot. In another exemplary embodiment, the wall has an inner portion adjacent to an outer portion where the inner portion includes a layer of chopped fibers and vinylester resin and the spigot is part of the inner portion. In another exemplary embodiment, the inner portion further includes an outer layer of c-veil reinforced vinylester resin, and includes about 90% by weight resin.

In yet another exemplary embodiment, the outer portion is formed from fiberglass reinforced resin, and the pipe section further includes a plurality of spaced apart outer annular ribs, each rib having a flat upper surface and a ramp surface extending from the outer portion to the flat upper surface. In an exemplary embodiment, each rib has a width to thickness ratio of at least about 15:1. In an alternate exemplary embodiment, the pipe has a core including resin and sand or concrete mortar. In further exemplary embodiment, the pipe section and sewer pipeline have the same general elliptical cross-sectional shape.

A system is also provided made of the exemplary embodiment pipe sections. For example in one exemplary embodiment, a system for slip lining a sewer pipeline is provided including a first pipe section and a second pipe section. The first pipe section has a wall having an outer surface having a non-circular cross-section, and a spigot at a first end portion of the wall defining a shoulder on the wall. The second pipe section has a wall having an outer surface having a non-circular cross-section and a second end portion fitted over the spigot of the first pipe section. A protective ring surrounds the spigot of the first pipe section for receiving a load from an external source for pushing the shoulder and thus, the first pipe section along the sewer pipeline. The protective ring is sandwiched between the shoulder and an end surface of the second pipe section. In an exemplary embodiment system, the seal is formed at an axial location offset from the protective ring when the protective ring is sandwiched between the first shoulder and the second end portion of the second pipe section.

A method is also provided for lining a sewer pipeline. An exemplary method requires providing a first pipe section having a first pipe wall having a first end portion and a second end portion, and a first spigot at the first end portion of the wall defining a first shoulder on the wall. The method also requires mounting a first protective ring around the first spigot and applying a load on the first protective ring axially moving the first pipe section within the sewer pipeline. The exemplary embodiment method further requires providing a second pipe section having a second pipe wall having a first end portion and a second end portion, and a second spigot at a first end portion of the second pipe wall defining a second shoulder on the second pipe wall. According to an exemplary embodiment method, a second protective ring is mounted around the second spigot and a load is applied on the second protective ring axially moving the second pipe section within the sewer pipeline causing the second pipe section second end portion to slide over the first spigot sandwiching the first protective ring between the first shoulder and the second end portion of the second pipe section and axially moving the first pipe section along with the second pipe section. A seal is formed between an outer surface of the first spigot and an inner surface of the second end portion of the second pipe section.

In an exemplary embodiment method, the seal is formed at an axial location offset from the protective ring when the protective ring is sandwiched between the first shoulder and the second end portion of the second pipe section. In another exemplary embodiment, an annular groove is formed on the outer surface of the first spigot and a seal is placed within the annular groove prior to applying a load on the second protective ring for forming the seal.

In another exemplary embodiment, the sewer pipeline and the first and second pipe sections have non-circular cross-sectional shapes

BRIEF DESCRIPTION OF THE DRAWINGS

These and other features and advantages of the present invention will become appreciated as the same becomes better understood with reference to the specification, claims and drawings wherein:

FIG. 3 is a cross-sectional front view of a section taken through the pipe of FIG. 1;

FIG. 4 is a partial cross-sectional view a rib incorporated in the pipe section shown in FIG. 1;

FIG. 5 is a schematic side view of another exemplary embodiment section of the present invention;

FIG. 6 is a cross-sectional front view of a section taken through the pipe of FIG. 5.

DETAILED DESCRIPTION OF THE INVENTION

Exemplary pipe sections, constructed in accordance with the principles of this invention, are of a composite structure and have an elliptical shape for purposes of closely conforming to the shape of an existing elliptical sewer pipeline and, thereby providing a fluid transport capacity that closely resembles the existing sewer pipeline. Pipe sections of this invention are especially well equipped for slip lining within an existing sewer pipeline by jacking in that they comprise joints at the ends that are specially designed to be self sealing. The pipe joints are also designed for accommodating jacking loads without damage to the pipe sections, and are constructed to be corrosion resistant to the sulfuric acid attack typically found inside a sewer line. An exemplary embodiment slip pipe section (or pipe section) of this invention is designed to overcome the shortcomings of conventional pipe section while allowing "live slip lining" of non-round sewer pipelines in need of repair.

Figure 1:
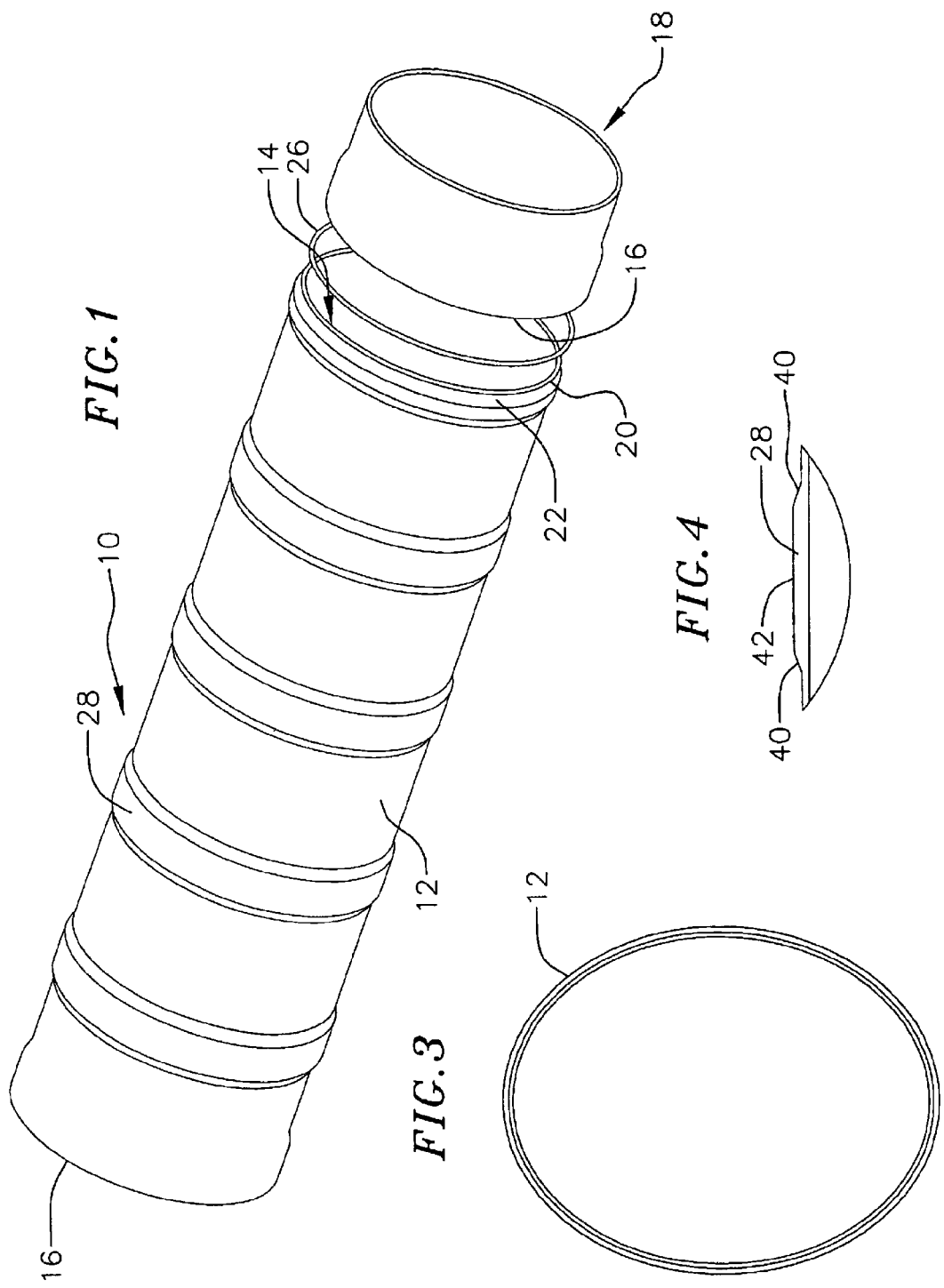
FIG. 1 is a schematic side view of an exemplary embodiment pipe section of the present invention.

FIG. 1 illustrates an exemplary embodiment pipe section 10, constructed according to the principles of this invention, comprising a structural pipe wall 12 that is elliptical in cross-section, as for example shown in FIG. 3. The pipe section is formed of a structural wall having an outer portion 13 over an inner portion 32. The outer portion 13 is formed from a fiberglass reinforced resin material. In the illustrated exemplary embodiment, the outer portion 13 of the pipe section structural wall in the exemplary embodiment is formed from a continuous glass fiber reinforced laminate material and more specifically is a filament wound continuous roving reinforced isophthalic polyester resin structural wall. The outer portion of wall has about 30% by weight resin and is formed with a wind angle in the range of about ±54° to about ±85°.

All surfaces of the pipe section wetted by the sewer gas, e.g., the pipe section inner surfaces, and which are exposed to sulfuric acid from the sewer are formed from a material resistant to sulfuric acid attack. In the exemplary embodiment shown in FIG. 2, the inner portion 32 comprises an inner layer 35 which is a vinylester liner made of c-veil reinforced vinylester resin defining the pipe section inner surface 33 and comprising approximately 90% resin by weight. The vinylester liner is a Society of Plastic Industries ("SPI") liner which is reinforced with corrosion and chemical resistant c-veil fibers. The inner portion 32 also comprises an outer layer adjacent to the inner layer 35 and formed from a chopped roving reinforced vinylester resin defining a liner 37 that comprises about 70% resin by weight. The chopped roving can be chopped e-glass (electrical glass) or chopped ecr-glass (electrical chemical resistant glass) or other chopped corrosion resistant fiberglass or other chopped fiberglass. This outer layer or liner can be formed by utilizing discontinuous chopped fibers applied by a "chopper gun," a process that is well known in the industry. The resin used to form both the inner and outer layers 35, 37 forming the inner portion is a vinylester resin which is highly resistant to the sulfuric acid activity found inside a sewer pipeline. Moreover, the c-veil as well as the the chopped e-glass, ecr-glass and other corrosion resistant fiberglass are chemically and corrosion resistant and thus, provide further resistance against a sulfuric acid attack. Typically sulfuric acid attacks the fiber/resin bond. However by using chopped fibers, in the outer layer of the inner portion, the acid can only attack the bond fiber for a short distance, i.e., the length of the fiber. Once at the end of the fiber, the attack stops since the sulfuric acid cannot permeate the pure resin. Thus, the outer layer of the inner portion provides greater resistance to a sulfuric acid attack in case of the sulfuric acid permeates the inner layer 35 of the inner portion 32 of the pipe section wall.

The pipe section structural wall 12 includes differently configured first and second axial end portions 14 and 16, designed to permit complementary interfacing and coupling with respective second and first axial end portions of an adjacent section pipe section of the same configuration to permit section-by-section assembly. Outer surfaces 17, 19 of the first and second end portions 14, 16, of the exemplary embodiment pipe section shown in FIG. 2 respectively are bell shaped. A joint is formed by the cooperative engagement of the first end portion of one pipe section and the second end portion of an adjacent pipe section FIG. 1 illustrates, in cutaway, a second end portion 16 of an adjacent pipe section 18 for purposes of showing how pipe sections of this invention are coupled together.

Figure 2:
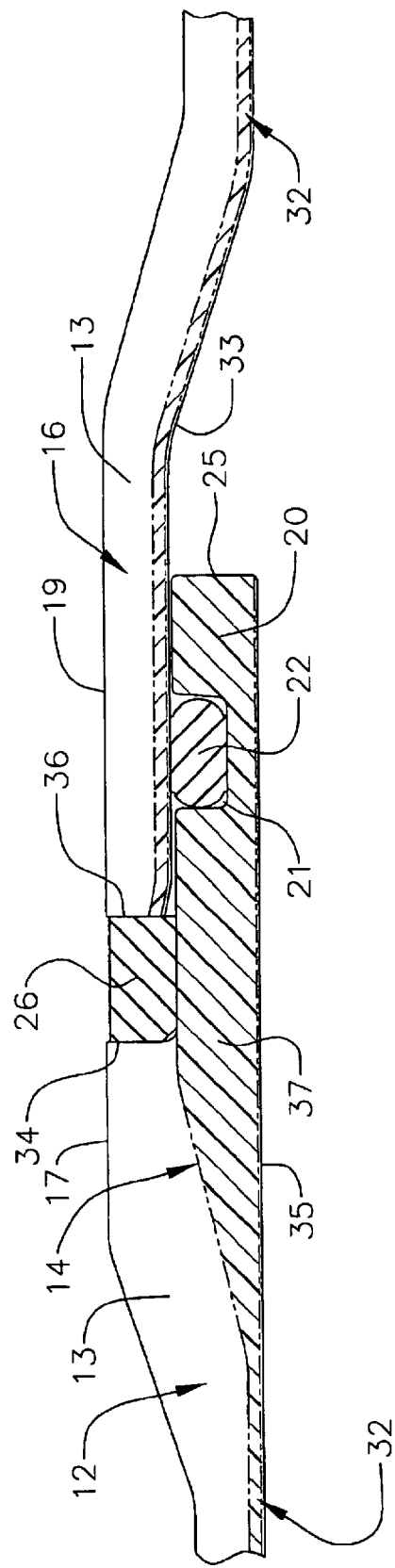
FIG. 2 is an enlarged partial cross-sectional view of the sealing joint between two pipe sections shown in FIG. 1.

The pipe section first axial end portion 14 comprises a resin rich chopped glass fiber spigot 20. The spigot extends beyond an end surface 34 of the pipe section structural wall outer portion 13. In the exemplary embodiment shown in FIG. 2, a seal 22 is fitted within a groove 21 defined on the spigot outer surface. The pipe section second axial end portion inner surface 33 is also bell shaped (as best shown in FIG. 2) to accommodate placement over the first axial end portion spigot 20. In the exemplary embodiment shown in FIG. 2, the spigot whose end 25 is exposed to the sewer gases is entirely formed from the same material as the pipe section inner portion inner layer 35, i.e., from chopped glass fibers embedded in resin. Moreover in the exemplary embodiment, the spigot 20 and the layer 35 are formed as a continuous integral structure.

When second end portion of second pipe section is slid of the spigot of an adjacent first pipe section, they sandwich a protective ring 26 between the end surface 34 of the first pipe section and an end surface 36 of the second adjacent pipe section. The protective ring 26, in the exemplary embodiment, is made of a thermoplastic material or hard rubber. When made from a thermoplastic material, the ring becomes a crush ring in that it crushes under a predetermined load. The ring 26 is designed to distribute jacking imposed loads evenly around the circumference, i.e., the end surface 34 of the pipe section by yielding or deformation.

To install a pipe section in an existing sewer pipeline, an upper portion of the sewer pipeline is cut open and a first pipe section with a protective ring mounted over the spigot is inserted into the pipeline. A jacking structure such as a bulkhead ring or a bell shaped structure is fitted over the spigot. The structure is connected to a jack which moves the bulkhead ring axially so that it axially pushes against the protective ring which pushes the pipe section end surface 34 moving the first pipe section axially into the pipeline. The sealing ring 22 is then mounted in the groove 21 formed on the spigot of the first pipe section. Alternatively, the sealing ring may be pre-mounted on the spigot prior to the insertion of the pipe section in the sewer pipeline. However, doing so may expose the seal to damage by the jacking structure.

A second pipe section with a protective ring around its spigot is then lowered in the pipeline with its second end portion facing the first pipe section's first end portion. The jacking structure is then slid over the second pipe section spigot. The hydraulic jacks push axially against the protective ring causing the second pipe section second end portion to slide over the first pipe section spigot and abut against the protective ring mounted on the first pipe section spigot. When this occurs, the seal 22 seals against the groove 21 of the first pipe section spigot and the inner surface 33 of the second pipe section.

As can be seen with this method the jacking structure does not come in contact with the sealing surfaces on the first and second pipe sections, i.e., the surfaces contacted by the seal 22, such as the surfaces defining the interior of groove 21 in the first pipe section and the inner surface 33 on the second end portion 16 of the second pipe section. In this regard, the jacking process cannot damage the sealing surfaces and thus can not deteriorate the quality of the seal formed between pipe sections.

Moreover with the exemplary embodiment, the jacking loads are all applied against the protective ring and not against the pipe section wall, thus, preventing damage to the pipe section wall. The protective ring if made from a thermoplastic material can be made to crush at a load between 2000 to 10000 psi. Similarly, a hard rubber ring will deflect under a predetermined load. A fiberglass reinforced resin pipe section wall typically has a crush, i.e., a compression strength of about 20,000 psi. In this regard, the protective ring will crush or deflect before the pipe section wall.

If the jacking structure is not squarely aligned with the protective, as for example, when the pipe section is misaligned, the load being applied by the jacking structure will be reacted on a smaller surface of the protective ring and may cause the protective ring to crush or deform so that a larger surface of the ring interfaces with the jacking structure for transferring the appropriate load to move the pipe section. For example, the protective ring may not crush or deflect when a 2000 psi load is applied upon it squarely. However, when the protective ring is not squarely aligned with the jacking structure, so that a smaller section of the jacking structure contacts the protective ring, the load may be sufficient to crush or deform the ring so that an appropriate surface area of the ring eventually contacts the jacking structure for transferring the load from the jacking structure to the pipe section for moving the pipe section.

In the exemplary embodiment pipe sections of the present invention, the pipe section jacking surface, i.e., the surface on which jacking loads are applied, as for example the end surface 34 on the pipe section first end portion is spaced apart from the sealing surfaces, i.e., the surfaces of the two pipe sections making contact with the seal 22. In this regard, if the jacking surfaces are damaged during the jacking operation, they do not affect the long term integrity of the sealing area. Moreover, the joint formed by the pipe sections of the present invention is specially designed to allow the structural loads to "go around" the joint while all wetted surfaces are made with an appropriate resin such as vinylester resin for resisting the corrosive gases within the pipe sections.

The pipe sections and joint are specially designed to provide a jacking area at the joint that is equal to the pipe wall area, i.e., the end surface 34 has the same thickness and the full pipe section wall. This means that the pipe wall and joint strength are equal under jacking loads. This is not possible with the joint formed by the conventional slip pipe sections such as the HOBAS pipe sections, since some of the wall thickness of the conventional pipe sections is taken up by the coupling used to couple such pipe sections.

As shown in FIG. 1, the pipe section 12 can also include one or more ribs 28 disposed circumferentially around the outside diameter of the pipe structural wall, for purposes of providing extra local pipe thickness. The ribs 28 provide significant stiffening of the pipe wall 12 for resisting grouting pressures at little additional weight when compared to a solid pipe wall. In the exemplary embodiment shown in FIGS. 1 and 4, the ribs are wound from the same material and during the winding of the outer portion 13 of the pipe wall so that they are integral with the pipe section wall 12. In an alternate embodiment, the ribs may be formed and attached to the pipe section 12 after the formation of the pipe section outer portion.

The jacking force required to move a pipe section is equal to the weight of the pipe section times the friction coefficient acting against the pipe section. Consequently, the lighter total pipe weight of the exemplary embodiment pipe section versus total available jacking force and pipe stiffness means the exemplary pipe section of this invention can be jacked a further distance than the conventional HOBAS pipe, thereby saving money during construction.

As can be seen from FIG. 4, the ribs incorporated into the exemplary embodiment, are very low profile and wide and are spaced apart from center to center by 35 inches. For example, each rib has a width of about 12 inches and a thickness of about 0.7 inch. In other words, each rib is over 15 times wide as it is thick. This makes the ribs act more like skid surfaces built directly into the pipe wall. Furthermore, the ribs have a very gradual tapered lead or ramp 40 on either side of their outer surface 42. This ramp prevents mechanical locking of the rib to protrusions in the host pipeline. The ramp also protects the pipe section from damage during jacking such as scratching that may be caused by imperfections in the host sewer pipeline.

Pipe section features of the rib structural pipe wall and stiffened joint area make the pipe section better suited for resisting grouting pressures and preventing leaks at the joints which are common in conventional pipe sections subject to grouting pressures. The exemplary embodiment pipe section shown in FIGS. 1–4 has substantially more stiffness at the joint—which for the exemplary embodiment has a total thickness greater than the thickness of the pipe section wall—compared to a pipe section without ribs. Therefore, for the same overall pipe stiffness (ribs plus joint) compared to a conventional pipe section solid wall such as the HOBAS pipe section wall, the joint provided by pipe sections of the exemplary embodiment of this invention will be stiffer locally and less likely to leak during grouting.

The pipe section of this invention can be made using conventional wet filament winding techniques with the inner portion inner layer 37 applied using conventional chopper gun application techniques or by winding pre-impregnate chopped fiber tape. For example, in the exemplary embodiment, a collapsible mandrel in the shape of the original sewer pipeline is used to form a pipe section. At one end, the mandrel is bell shaped for forming the second end portion bell shaped inner surface of the pipe section. The c-veil reinforced vinylester layer is first wound on the mandrel using conventional filament winding techniques to a thickness of at least 0.01 inch. In the exemplary embodiment, the C-veil reinforced vinylester has a thickness of 0.02 inch. The chopped roving reinforced vinylester layer is then applied using a chopper gun application technique or by winding pre-impregnated chopped fiber tape. During this step, in the exemplary embodiment, the spigot of the first end portion of the pipe section is also formed. The outer portion 13 of the pipe is formed next by a filament winding continuous roving reinforced isophthalic polyester roving. Once the pipe section is formed the mandrel is collapsed for removal.

In the exemplary embodiment shown in FIGS. 1–4, the pipe wall has a thickness of about 9/16 inch with the outer portion of the wall being about 0.47 inch thick, and the inner portion 32 away from the end portions being about 1/8 inch having an inner layer 35 of about 0.02 inch thick. The outer portion of the pipe section wall is wound with a ±54° wind angle whereas the ribs are wound with a 70°–80° wind angle.

Another exemplary embodiment pipe section for slip lining is shown in FIG. 5, having an elliptical cross-section as shown in FIG. 6 having the same shape as the cross-section of a sewer pipeline which it will line. This embodiment pipe section may have a resin-sand filled core or a concrete mortar filled core.

Figure 7:
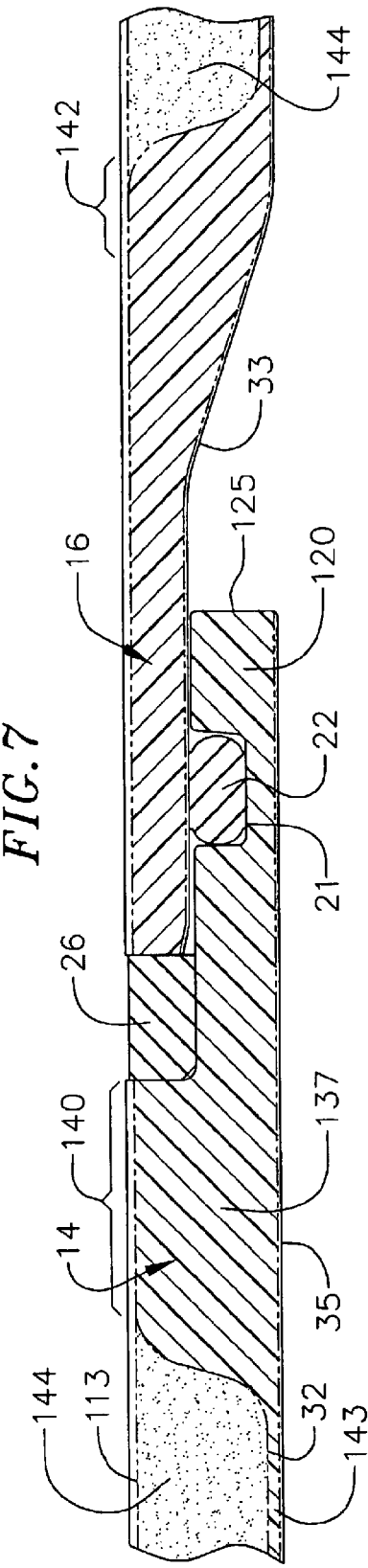
FIGS. 7 and 8 are enlarged partial cross-sectional views of other exemplary embodiment sealing joints, respectively, between two pipe sections shown in FIG. 5.
Figure 8:
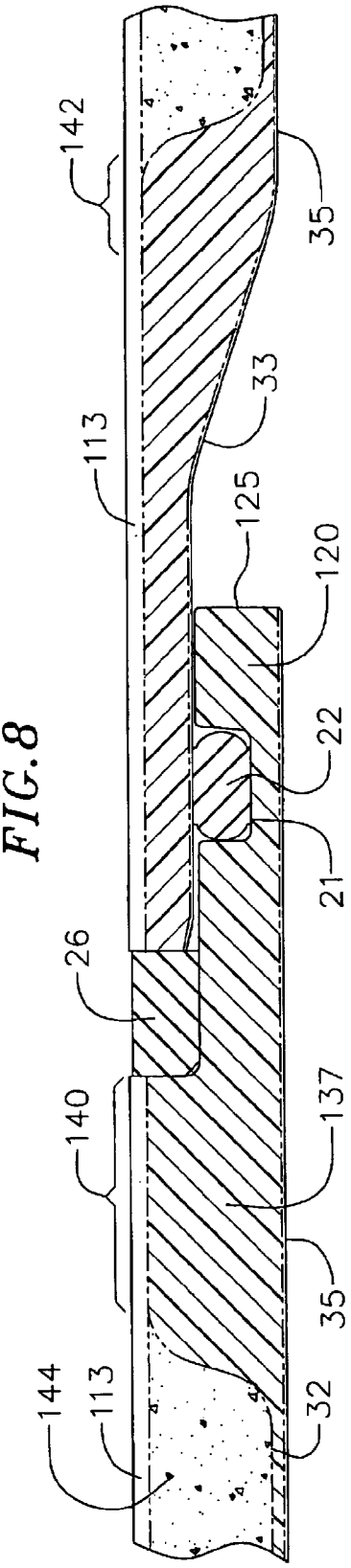

With this embodiments, the same reference numerals are used in FIGS. 5–8 to denote the same portions of the pipe section as those shown in FIGS. 1–3. With the embodiment, as shown in FIGS. 7 and 8, the inner surface 33 of the second end portion 16 of the pipe section is bell shaped to accommodate a spigot 120 extending from the first end portion 14 of the pipe section. The spigot is defined by reducing the thickness of the first end portion wall of the pipe. The thickness of the spigot 120 and the thickness of the second end portion 16 are chosen such that when the end portion 16 is slid over the spigot 120, the second end portion and spigot have a combined total wall thickness equal to the wall thickness of the pipe section.

As with the previous embodiments, all surfaces wetted by the sewer gas have c-veil reinforced vinylester SPI inner layer 35 and chopped roving reinforced vinylester SPI outer layer 37, respectively. A groove 21 is defined on the outer surface of the spigot for accommodating a seal 22. A protective ring 26 made from thermoplastic material or hard rubber is mounted around the spigot as discussed with the previous embodiments. This pipe is also inserted into the host sewer pipeline as described in relation with the first embodiment shown in FIGS. 1–4.

To form the pipe section according to the exemplary embodiments shown in FIGS. 7 and 8, a mandrel, preferably a collapsible mandrel is chosen having the shape of the sewer pipeline to be lined. The mandrel should have a section being bell shaped for forming the bell shaped second end portion inner surface 33 of the pipe section. A c-veil inner layer with an vinylester resin is wound on the mandrel for forming an inner layer of the pipe section having the thickness of at least about 0.01 inch. In the exemplary embodiment, the inner layer is wound using conventional filament winding techniques to have a thickness of about 0.02 inch. A chopped roving reinforced vinylester layer is then formed by using a conventional chopper gun application technique or by winding pre-impregnated chopped fiber tape, i.e., a tape formed from chopped fibers impregnated with a vinylester resin. As with the previous exemplary embodiments, the chopped roving in this exemplary embodiment may be fiberglass, chopped e-glass, chopped ecr-glass, other chopped corrosion resistant fiberglass, or other chopped fiberglass. The chopped roving reinforced vinylester layer also forms the end portions of the pipe section including the spigot as well as sections 140 and 142 inward from the spigot 120 and the second end portion 16. In the exemplary embodiments shown in FIGS. 7 and 8, the sections 140 and 142 are much thicker (e.g., about 1 3/16 inches) compared to a central section 143 of the inner portion of the pipe section wall not extending to the end portions which has a thickness of about 1/8 inch. In this regard a pocket 144 is defined between the end portions and the central section of the outer portion inner layer of the pipe section. In the embodiment shown in FIG. 7 the pocket is filled with resin and sand whereas in the embodiment shown in FIG. 8 it is filled with concrete mortar.

In the embodiment shown in FIG. 7, sand impregnated with resin as for example a polyester or a vinylester resin, may be applied into the pocket 144 by using a spraying method where the sand and resin are sprayed through a nozzle using high pressure air using a technique such as a Gunite technique or other known methods. The sand with resin sticks onto the pocket walls as well as on to itself.

Similarly, in the embodiment shown in FIG. 8 the concrete mortar may be applied by the same technique where the concrete mortar is sprayed out through a gun or a nozzle with high pressure air such as a Gunite process or other known methods. In an alternate embodiment, a predetermined a layer of sand and resin is applied to a fiberglass screen. The resin causes the sand to attach to itself and to the fiberglass screen. The resin wets the fiberglass screen. The fiberglass screen with attached layer of sand and resin is wound within the pocket 144. In one exemplary embodiment, the thickness of the layer of sand may be chosen such that multiple windings of the fiber screen are applied to fill in the pocket 144. Similarly, for the embodiment shown in FIG. 8 the concrete mortar may be applied as a layer having a predetermined thickness to a fiberglass screen. The concrete mortar sticks to the fiberglass screen which is then wound around the pipe wall within the pocket 144 to fill the pocket with the concrete mortar. In an alternate exemplary embodiment, in the embodiment shown in FIG. 8, instead of a fiberglass screen a metallic screen is used or the combination of metallic and fiberglass screens are used. With the aforementioned embodiment the fiberglass screen and/or metallic screens provide further reinforcement to the pipe wall.

Afterwards, in the exemplary embodiments, a layer of resin such as for example a polyester resin such as an isophthalic polyester resin reinforced with chopped roving or a continuous filament comprising about 30% by weight resin is wound over the outer layer 137 and the filled pocket 144 forming the pipe section outer portion or jacket 113. The formed pipe is the cured and the mandrel is collapsed and removed. As with the previous embodiments, the wall of these embodiment pipe sections have a higher crush strength than the protective ring.

In the exemplary embodiments shown in FIGS. 7 and 8, the pipe section has a wall thickness of about 1¼-inches. The outer layer of the inner portion has a thickness of about 0.1 inch at the central section 143. The inner layer 35 of the inner portion has a thickness of about 0.02 inch. In the exemplary embodiment shown in FIG. 7 where the pocket 144 is filled with sand and resin, the outer jacket 113 has a thickness of about ¹⁄₁₆ inch. In the exemplary embodiment shown in FIG. 8 where the pocket is filled with concrete mortar, the outer jacket 113 has a thickness of about ⅛th-inch.

In the exemplary embodiment pipe sections shown in FIGS. 7 and 8, the end portions of each pipe section have a smaller thickness than the remainder of the pipe section so that the end portions can interface with end portions of adjacent pipe sections to form the joints between pipe sections. However because the end portions are made from reinforced resin, e.g. chopper roving reinforced resin—which has a greater compression strength than sand and resin, and concrete mortar—the end portions have the about same axial compression strength as the remaining pipe section, i.e., the central section of the pipe which is filled with sand and resin or concrete mortar. Thus, the axial compression strength of the exemplary embodiment pipe sections is not compromised at the end portions of the pipe sections. As can be seen, the exemplary embodiment pipe sections can be designed to have the same axial compression strength at their ends as at their central portions even though the thickness of the pipe sections is much less at such ends.

Although, limited embodiments of pipe sections of this invention and applications for the same, have been described and illustrated herein, many modifications and variations will be apparent to those skilled in the art. Accordingly, it is to be understood that within the scope of the appended claims, pipe sections of this invention may be embodied other than as specifically described herein. For example, the entire inner portion of the pipe wall may be made from chemical and corrosion resistant c-veil reinforced vinylester or with chopped roving reinforced vinylester. Moreover, a seal such as the seal 22 may be mounted on a groove formed on an inner surface of the pipe section second end portion for sealing against the spigot outer surface. This may be done in lieu of mounting the seal in a groove formed on the spigot or in addition to mounting the seal in a groove formed on the spigot. Moreover, the exemplary embodiment pipe sections may be made in any circular or non-circular cross-sectional shape such as for example a horseshoe or parabolic cross-sectional shape.

What is claimed is:

1. A pipe section for slip lining a sewer pipe line comprising:
   a pipe section wall having an outer surface having a non-circular cross-section;
   a spigot at a first end portion of the wall defining a shoulder on said wall;
   a protective ring surrounding the spigot for receiving a load from an external source for pushing the shoulder and thus, the pipe section along the sewer pipeline;
   wherein the wall comprises an inner portion adjacent to an outer portion, wherein the inner portion comprises a layer of chopped fibers and vinylester resin and wherein the spigot is part of the inner portion; and
   wherein the outer portion is formed from fiberglass reinforced resin, the pipe section further comprising a plurality of spaced apart outer annular ribs, each rib having a flat upper surface and a ramp surface extending from the outer portion to the flat upper surface, said rib width to thickness ratio being at least about 15:1.

2. The pipe section as recited in claim 1 wherein the protective ring is made from a thermoplastic material.

3. The pipe section as recited in claim 1 wherein the protective ring is made from a hard rubber.

4. The pipe section as recited in claim 1 wherein the crush protective ring has a compression strength lower than a compression strength of the pipe wall.

5. The pipe section as recited in claim 1 wherein a bell shaped inner surface is defined on a second end portion of the wall for receiving a spigot of another pipe section.

6. The pipe section as recited in claim 1 further comprising a seal on the spigot.

7. The pipe section as recited in claim 6 further comprising an annular groove formed on an outer surface of the spigot, wherein the seal is fitted in the groove.

8. The pipe section as recited in claim 1 wherein the inner portion further comprises an outer layer of c-veil reinforced vinylester resin, said outer layer comprising about 90% by weight resin.

9. The pipe section as recited in claim 1 comprising a core comprising resin and sand.

10. The pipe section as recited in claim 1 comprising a core comprising concrete mortar.

11. The pipe section as recited in claim 1 wherein the sewer pipeline has an inner surface having a cross-sectional shape and wherein the pipe section outer surface has the same general cross-sectional shape.

12. The pipe section as recited in claim 1 wherein the sewer pipeline has a non-circular cross-sectional shape and wherein the pipe section has a non-circular cross-sectional shape.

13. The pipe section as recited in claim 1 wherein the sewer pipeline has a cross-sectional shape selected from the shapes consisting of elliptical, horseshoe and parabolic, and wherein the pipe section has a cross-sectional shape that is of the same type as that of the sewer pipeline.

14. The pipe section as recited in claim 1 wherein the shoulder of the pipe section wall has a compression strength that is about the same as a compression strength of a central portion of the pipe section wall.

15. A pipe system for slip lining a sewer pipe line comprising:
   a first pipe section comprising,
      a wall having an outer surface having a non-circular cross-section, and
      a spigot at a first end portion of the wall defining a shoulder on said wall;
   a protective ring surrounding the spigot of the first pipe section for receiving a load from an external source for pushing the shoulder and thus, the first pipe section along the sewer pipeline; and
   a second pipe section having a wall having an outer surface having a non-circular cross-section and a second end portion fitted over the spigot of the first pipe section, wherein the protective ring is sandwiched between the shoulder and an end surface of the second pipe section.

16. The system as recited in claim 15 wherein the second pipe section comprises an inner surface having a diameter, wherein the diameter of the second pipe section inner surface is increased at the second end portion for overlapping the spigot of the first pipe section.

17. The system as recited in claim 16 wherein the first pipe section has the same geometry and size as the first pipe section.

18. The system as recited in claim 15 further comprising a seal between the spigot of the first pipe section and an inner surface of the second pipe section second end portion.

19. The system as recited in claim 18 further comprising a groove on the spigot of the first pipe section, wherein the seal is fitted within the groove.

20. The system as recited in claim 18 wherein the seal is axially offset from the protective ring.

21. The system as recited in claim 15 wherein the protective ring is made from a thermoplastic material.

22. The system as recited in claim 15 wherein the protective ring is made from hard rubber.

23. The system as recited in claim 15 wherein the protective ring, has a compression strength lower than a compression strength of either of the pipe sections.

24. The system as recited in claim 15 wherein each wall of the first and second pipe sections comprises an inner portion adjacent to an outer portion, wherein the inner portion comprises a layer of chopped fibers and vinylester resin and wherein the spigot is part of the inner portion.

25. The system as recited in claim 24 wherein the inner portion further comprises an outer layer of c-veil reinforced vinylester resin, said outer layer comprising about 90% by weight resin.

26. The system as recited in claim 24 wherein either or both pipe sections comprise a core comprising resin and sand.

27. The system as recited in claim 24 wherein either or both pipe sections comprise a core comprising concrete mortar.

28. The system as recited in claim 15 wherein the sewer pipeline has an inner surface having a cross-sectional shape and wherein both pipe section outer surfaces have the same general cross-sectional shape as the sewer pipeline inner surface.

29. The system as recited in claim 15 wherein sewer pipeline comprises a non-circular cross-sectional shape and wherein both pipe sections have a non-circular cross-sectional shape.

30. The system as recited in claim 15 wherein the sewer pipeline has a cross-sectional shape selected from the shapes consisting of elliptical, horseshoe and parabolic, and wherein both pipe sections have a cross-sectional shape that is of the same type as that of the sewer pipeline.

31. The system as recited in claim 15 wherein the shoulder has a compression strength that is about the same as a compression strength of a central portion of first pipe section wall.

32. The system as recited in claim 15 wherein an end of the second end portion of the second pipe section has a compression strength that is about the same as a compression strength of a central portion of the second pipe section wall.

33. A method for lining a sewer pipeline comprising:
   providing a first pipe section comprising,
      a first pipe wall having a first end portion and a second end portion, and
      a first spigot at the first end portion of the wall defining a first shoulder on said wall;
   mounting a first protective ring around the first spigot;
   applying a load on the first protective ring axially moving said first pipe section within said sewer pipeline;
   providing a second pipe section comprising,
      a second pipe wall having a first end portion and a second end portion, and
      a second spigot at a first end portion of the second pipe wall defining a second shoulder on said second pipe wall;
   mounting a second protective ring around the second spigot; and
   applying a load on the second protective ring axially moving said second pipe section within said sewer pipeline causing said second pipe section second end portion to slide over the first spigot sandwiching said first protective ring between the first shoulder and the second end portion of the second pipe section and axially moving said first pipe section along with said second pipe section.

34. The method as recited in claim 33 further comprising forming a seal between an outer surface of the first spigot and an inner surface of the second end portion of the second pipe section.

35. The method as recited in claim 34 wherein forming a seal comprises forming a seal at an axial location offset from the protective ring when the protective ring is sandwiched between the first shoulder and the second end portion of the second pipe section.

36. The method as recited in claim 34 wherein forming comprises providing a seal material after applying the load on the first protective ring and prior to applying the load on the second protective ring.

37. The method as recited in claim 34 wherein an annular groove is formed on the outer surface of the first spigot and wherein forming a seal comprises placing a seal within the annular groove after applying the load on the first protective ring and prior to applying the load on the second protective ring.

38. The method as recited in claim 33 wherein the first protective ring has a compression strength wherein the first and second pipe section walls have a compressive strength, and wherein the compression strength of the first and second pipe section walls is greater than the compression strength of the first protective ring.

39. The method as recited in claim 38 wherein the first protective ring is formed from a thermoplastic material.

40. The method as recited in claim 38 wherein the first protective ring is formed from hard rubber.

41. The method as recited in claim 33 wherein the first and second pipe sections have outer surfaces having non-circular cross-sectional shapes.

42. The method as recited in claim 41 wherein the sewer pipeline comprises an inner surface having a non-circular cross-sectional shape, wherein the first and second pipe section outer surfaces have the same general cross-sectional shape and the sewer pipeline inner surface.

43. The method as recited in claim 33 wherein the sewer pipeline and the first and second pipe sections comprise non-circular cross-sectional shapes.

44. The method as recited in claim 33 wherein the sewer pipeline has a cross-sectional shape selected from the shapes consisting of elliptical, horseshoe and parabolic, and wherein the first and second pipe sections have a cross-sectional shape that is of the same type as that of the sewer pipeline.

45. The method as recited in claim 33 wherein the sewer pipeline has a non-circular cross-sectional shape.

46. The method as recited in claim 33 wherein the first and second spigots comprise a chopped fiber reinforced resin material.

47. A pipe system for slip lining a sewer pipe line comprising:
  a first pipe section comprising,
    a wall having an outer surface having a non-circular cross-section, and
    a spigot at a first end portion of the wall defining a shoulder on said wall;
  a protective ring surrounding the spigot of the first pipe section for receiving a load from an external source for pushing the shoulder and thus, the first pipe section along the sewer pipeline; and
  a second pipe section having a wall having an outer surface having a non-circular cross-section and a second end portion fitted over the spigot of the first pipe section, wherein the protective ring is sandwiched between the shoulder and an end surface of the second pipe section, wherein each wall of the first and second pipe sections comprises an inner portion adjacent to an outer portion, wherein the inner portion comprises a layer of chopped fibers and vinylester resin and wherein the spigot is part of the inner portion.

48. The system as recited in claim 47 wherein the inner portion further comprises an outer layer of c-veil reinforced vinylester resin, said outer layer comprising about 90% by weight resin.

* * * * *

UNITED STATES PATENT AND TRADEMARK OFFICE
CERTIFICATE OF CORRECTION

PATENT NO. : 6,920,900 B2
DATED : July 26, 2005
INVENTOR(S) : Friedrich

It is certified that error appears in the above-identified patent and that said Letters Patent is hereby corrected as shown below:

Title page,
Item [57], ABSTRACT,
Line 8, delete "is formed is formed", insert -- is formed --.

Column 11,
Line 32, delete "wherein the first pipe section", insert -- wherein the second pipe section --.
Line 48, delete ",".

Column 12,
Line 53, after "forming", insert -- a seal --.

Column 13,
Line 14, delete "and", insert -- as --.

Signed and Sealed this

Fourteenth Day of March, 2006

JON W. DUDAS
*Director of the United States Patent and Trademark Office*